United States Patent
Wada et al.

(10) Patent No.: US 6,729,162 B2
(45) Date of Patent: May 4, 2004

(54) ELECTRIC FURNACE EXTENSION METHOD AND EXTENSION APPARATUS FOR OPTICAL FIBER GLASS PREFORM

(75) Inventors: Tetsuro Wada, Toyko (JP); Masahide Kuwabara, Tokyo (JP); Yukio Komura, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 388 days.

(21) Appl. No.: 09/778,107

(22) Filed: Feb. 7, 2001

(65) Prior Publication Data

US 2001/0009104 A1 Jul. 26, 2001

Related U.S. Application Data

(62) Division of application No. 09/047,373, filed on Mar. 25, 1998, now Pat. No. 6,279,353.

(30) Foreign Application Priority Data

Mar. 25, 1997 (JP) ................................................ 9-71590

(51) Int. Cl.[7] ............................................ C03B 23/057
(52) U.S. Cl. ............................................ 65/407; 65/36
(58) Field of Search ........................... 65/407, 435, 500, 65/36, 501

(56) References Cited

U.S. PATENT DOCUMENTS

| 3,249,414 | A | 5/1966 | Hamilton |
| 4,407,667 | A | 10/1983 | LeNoane |
| 4,631,079 | A | 12/1986 | Clark |
| 5,013,345 | A | 5/1991 | Itoh |
| 5,030,265 | A | 7/1991 | Suzuki |

FOREIGN PATENT DOCUMENTS

JP 8-59274 3/1996

*Primary Examiner*—John Hoffmann
(74) *Attorney, Agent, or Firm*—Arent Fox Kintner Plotkin & Kahn, PLLC

(57) ABSTRACT

An electric furnace extending method and apparatus for an optical fiber glass body alignment when connecting the extension use body and pulling member and making it possible to immediately start the extension after the fusing of the connection portion. A centering mechanism for centering the free end portion of the body and member on the furnace center side is provided between the furnace pipe of the electric furnace and grips of the extension use glass body and between the furnace pipe and the pulling member. The free end portion is centered by this centering mechanism, then the gripped sides of the body and member are fixed, the front ends of the two free end portions are abutted and fused and bonded at the highest temperature portion inside the electric furnace, then the highest temperature portion is moved to the extension portion of the glass body side and the extending of the glass body is commenced.

1 Claim, 9 Drawing Sheets

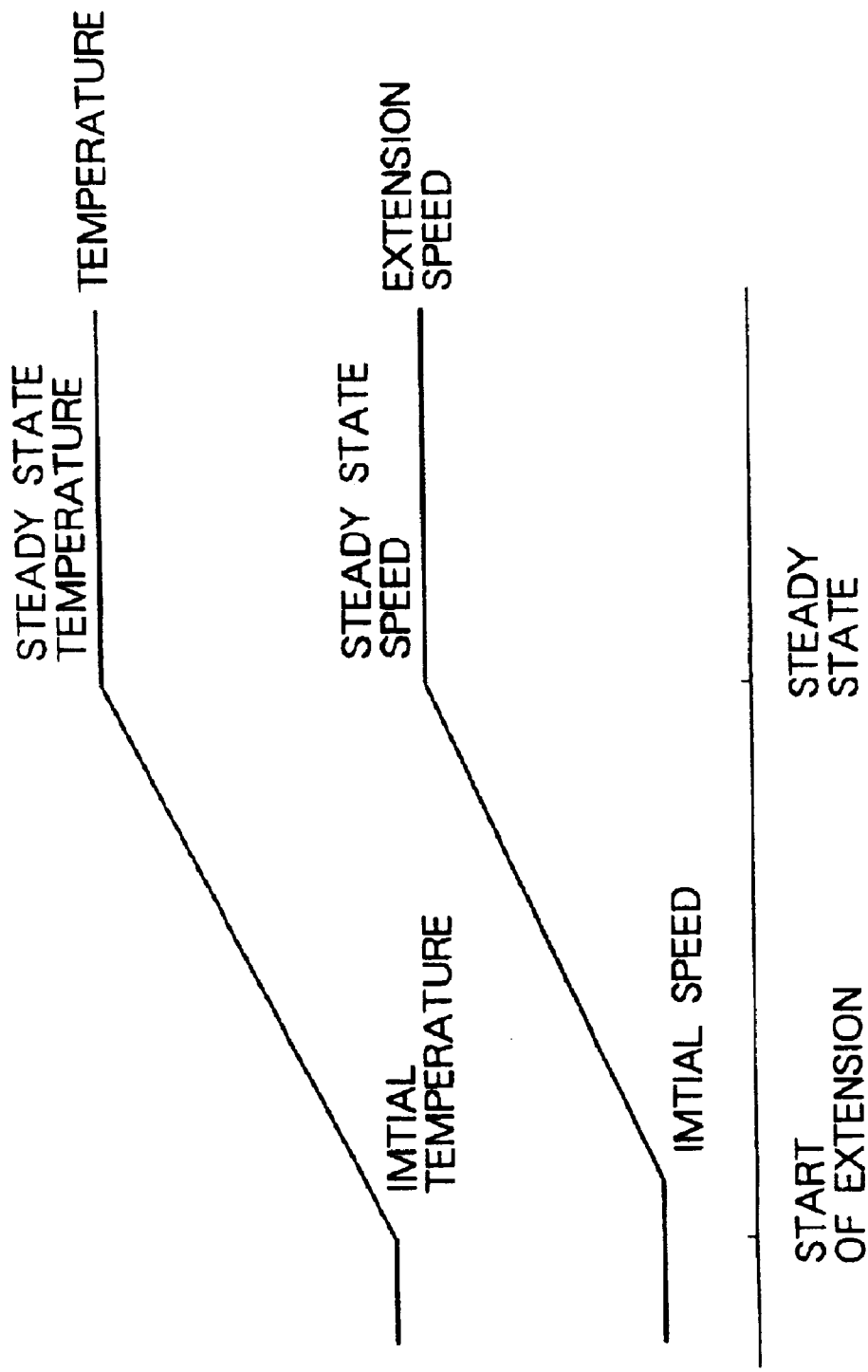

ELECTRIC FURNACE EXTENSION METHOD AND EXTENSION APPARATUS FOR OPTICAL FIBER GLASS PREFORM

This is a Division of Application No. 09/047,373 filed Mar. 25, 1998, now, U.S. Pat. No. 6,279,353. The disclosure of the prior application is hereby incorporated by reference herein in its entirety.

BACKGROUND OF THE INVENTION

1. Field of the Invention

The present invention relates to an electric furnace extension method for extending an optical fiber glass body (preform) so as to obtain a predetermined outer diameter, and to an apparatus of the same.

Note that, in the present specification, an "optical fiber glass body" includes, other than the usual glass body for extension, an extension optical fiber glass body obtained by extending this glass body, i.e., a "preform".

2. Description of the Related Art

Usually, an optical fiber is produced by synthesizing an optical fiber porous glass body by a VAD process or an external CVD process, then dehydrating and sintering the optical fiber porous glass body to obtain a transparent glass body for the optical fiber, extending this to obtain an outer diameter suited for wire-drawing to form a drawn optical glass body (referred to here as a "preform"), and then wire-drawing this preform to form an optical fiber including a core and a cladding.

Heretofore, the optical fiber glass body has been drawn by heat extension of the optical fiber glass body using a burner using an oxyhydrogen flame as a heat source, that is, the burner extension method. In this burner extension method, control of the outer diameter of the extended optical fiber glass body is relatively easy, but the extension rate is slow—usually 8 to 10 mm/min.

Due to recent technical advances and along with demands for improvement of manufacturing efficiency, the outer diameter of the porous optical fiber glass body synthesized by the VAD process or external CVD process has become much greater than in the past. Along with this, it suffers from the disadvantage in terms of the heat in the burner extension method using a burner using an oxyhydrogen flame as the heat source in the case of an optical fiber glass body having an outer diameter before extension of more than a certain value.

For this reason, a heat extension method using a heating furnace having a larger heating capacity than a burner, more specifically an electric heater (hereinafter referred to as the "electric furnace extension method") is being adopted for optical fiber glass bodies having an outer diameter before extension of more than a certain value. Such an electric furnace extension method can increase the extension rate since the heating capacity is large. For example, in contrast to the extension rate of the burner extension method of 8 to 10 mm/min, the extension rate is 30 mm/min or more in the electric furnace extension method. For this reason, the electric furnace extension method is advantageous from the viewpoint of productivity not only for the extension of an optical fiber glass body having a large outer diameter, but also for an extension glass body having a small outer diameter.

Note that in this electric furnace extension method, since the heating range is wide, it is limited to use for vertical bodies long in the vertical direction. Accordingly, the preform is extended from top to bottom.

In this electric furnace extension method, it is necessary to connect an extension-glass-body support rod (pulling glass member) to the end portion of the optical fiber glass body or the extension glass body (preform) before extension. In the past, this connection was generally achieved in a separate step of flame extension, but it is preferable to achieve this connection in the same electric furnace extension process.

Where this connection is performed in the same electric furnace extension process, however, it suffers from the disadvantage that this connection is difficult. That is, it is necessary to align the axial center of the end portion of the glass body with the axial center of the end portion of the extension support rod (pulling use glass member), but the centers tend to be offset in connection. When the axial centers are offset in connection, the distribution of stress in the cross-section of the connection portion becomes nonuniform, so trouble such as a bending in the drawn body or breakage of the connection portion sometimes occurs.

The axial alignment at the time of extension an optical fiber glass body using an electric furnace is usually performed as follows.

The two glass members (extension use glass body and pulling use glass member), one end of each of which is held elsewhere, are inserted into the heated furnace from reverse directions to each other and made to abut against each other. The abutting ends of the two are heated and fused to each other, then the gripping member gripping the pulling use glass member is moved downward at a predetermined speed while moving the gripped portion of the extension use glass body downward at a constant speed so as to stretch the extension use glass body and extend it to the predetermined outer diameter.

FIG. 1 is a view of an example of the configuration of this type of extension apparatus for an optical fiber glass body of the related art.

In FIG. 1, 91$a$ denotes an extension use glass body (or optical fiber glass body) to be extended, and 91$b$ denotes a dummy pulling use glass member (extension-out use glass member). Reference numeral 93 denotes a furnace body. A furnace pipe 94 containing an electric heater is disposed in the furnace body 93.

One end portion of each of the extension use glass body 91$a$ and the pulling use glass member 91$b$ is gripped and affixed by gripping members 95 and 96 comprising for example three-claw chucks. The gripping members 95 and 96 can be moved by a moving stand 97 to which the gripping members 95 and 96 are affixed in the vertical direction in a state illustrated in FIG. 1. Reference numeral 98 denotes a guide rail for guiding the moving stand 97.

The optical fiber glass body is extended (stretched) by the above optical fiber body extension apparatus as follows:

(1) The fixed ends of the extension use glass body 91$a$ and the pulling use glass member 91$b$ are gripped and affixed by the gripping members 95 and 96, respectively. The front ends of the free end portions of the affixed extension use glass body 91$a$ and pulling use glass member 91$b$ are axially aligned, then the two are moved into the furnace pipe 94 and made to abut against each other.

(2) The furnace pipe 94 is heated to the predetermined temperature to heat and fuse the abutted end surfaces of the two to join them, then the gripping member 95 gripping the pulling use glass member 91$b$ is moved downward to extend the extension use glass body 91$a$ to the predetermined outer diameter.

(3) The axial alignment of the extension use glass body 91a and the pulling use glass member 91b is carried out when heating and fusing the abutted end surfaces of the two in the furnace pipe 94 by the extension apparatus. For this axial alignment (centering), the fixed end portions of the extension use glass body 91a and the pulling use glass member 91b are for example moved delicately by hand within the range of free play of the gripping members 95 and 96, for example, the three-claw chucks, to center the axial centers of the front ends of the free end portions, then are fixed in place. The fixed front ends of the free end portions are then made to abut in the furnace pipe 94. The state of axial alignment is confirmed visually from an observation window 94A provided in the furnace pipe 94.

This centering method of the related art takes a long time. Also, also the precision of alignment is not very good. For example, an axial deviation of ±1 to ±2 mm (5 to 10% of the diameter of the glass member) occurs in the horizontal plane. If the precision of the axial alignment is poor, the distribution of stress at the cross-section of the connection portion of the extension use glass body 91a and the pulling use glass member 91b will become nonuniform at the time of extending, and trouble such as occurrence of bending in the extended fiber glass body or breakage of the connection portion may occur.

Further, where the optical fiber glass body is extended by the electric furnace extension method explained above, bending or waviness sometimes occur in the extended fiber glass body (preform) or variation sometimes occurs in the outer diameter, so the outer diameter sometimes deviates from the prescribed value.

Further, improvement of the extension rate of preforms has also been demanded from the viewpoint of productivity.

SUMMARY OF THE INVENTION

An object of the present invention is to overcome the disadvantages encountered when an optical fiber glass body and a pulling use glass member are connected in the electric furnace extension process and provide an electric furnace extension method and extending apparatus for an optical fiber glass body capable of easily and simply performing axial alignment (centering) of the front ends of the free end portions of the glass body and pulling use glass member to be abutted and connected in an electric furnace. More specifically, the object thereof is to provide an electric furnace extension method for fixing the optical fiber glass body to the extending apparatus, connecting the two in the electric furnace, and then starting the extension.

Another object of the present invention is to provide an electric furnace extension method and extending apparatus for an optical fiber glass body capable of improving the precision of the extended outer diameter of the optical fiber glass body.

Still another object of the present invention is to provide an electric furnace extension method and extending apparatus capable of increasing the extension rate of an optical fiber preform.

According to a first aspect of the present invention, there is provided an apparatus for extending an optical fiber glass body, comprising: an electric furnace for heating an extension optical fiber glass body to be extended; a first holding member positioned above said electric furnace, and holding a fix end of a upper portion of said extension optical fiber glass body to be extended; a second holding member positioned below said electric furnace and holding a fix end of a lower portion of a pulling glass member; a first axial center alignment mechanism provided between said electric furnace and said first holding member and for aligning an axial center of a tip of a free end of a lower portion of said extension optical fiber glass body; and a second axial center alignment mechanism provided between said electric furnace and said second holding member and for aligning an axial center of a tip of a free end of a upper portion of said pulling glass member, an axial center of said axial center alignment mechanism being met with an axial center of said second axial center alignment mechanism.

The first axial center alignment mechanism may comprise a pair of axial center alignment holders provided a pair of V-shaped grooves facing to a longitudinal direction of said extension optical fiber glass body at facing centers thereof, and having self axial center alignment function, a pair of supporting bars provided at facing portions to support said pair of axial center alignment holders, and a pair of bases having movement mechanisms for moving said pair of axial center alignment holders and said pair of supporting bars as a unit in a horizonal direction.

The second axial center alignment mechanism may also comprise a pair of axial center alignment holders provided a pair of V-shaped grooves facing to a longitudinal direction of said pulling glass member at facing centers thereof, and having self axial center alignment function, a pair of supporting bars provided at facing portions to support said pair of axial center alignment holders, and a pair of bases having movement mechanisms for moving said pair of axial center alignment holders and said pair of supporting bars as a unit in a horizontal direction.

According to a second aspect of the present invention, there is provided a process of connecting and fixing an extension optical fiber glass body to be extended and a pull glass member in an apparatus for extending the optical fiber glass body, comprising: an electric furnace for heating the optical fiber glass body; a first holding member positioned above said electric furnace, and holding a fix end of a upper portion of said extension optical fiber glass body to be extended; a second holding member positioned below said electric furnace and holding a fix end of a lower portion of a pulling glass member; a first axial center alignment mechanism provided between said electric furnace and said first holding member and for aligning an axial center of a tip of a free end of a lower portion of said extension optical fiber glass body; and a second axial center alignment mechanism provided between said electric furnace and said second holding member and for aligning an axial center of a tip of a free end of a upper portion of said pulling glass member, an axial center of said axial center alignment mechanism being met with an axial center of said second axial center alignment mechanism, said process including the steps of:

provisionally fixing a fix end of a upper portion of said extension optical fiber glass body to said first holding member;

holding a tip of a free end of a lower portion of said extension optical fiber glass body by said first axial center alignment mechanism and aligning an axial center of said tip of said free end;

holding and fixing said fix end of the lower portion of said extension optical fiber glass body by said first holding member;

releasing said pair of axial center holding members of said first axial center alignment mechanism and positioning the tip of the free end of said extension optical fiber glass body at a predetermined position in said electric furnace;

holding and fixing the fix end of the lower portion of said pulling glass member by said second holding member;

holding a tip of a free end of a upper portion of said pulling glass member by said pair of second axial center alignment mechanism having a self axial center alignment function to align the axial center of the tip of said free ends;

holding and fixing the fix end of the lower portion of said pulling glass member by said second holding member; and releasing said pair of axial center holding members of said second axial center alignment mechanism and positioning the tip of the free end of said pulling glass member, to thereby coincide the tip of the free end of said extension optical fiber glass body and the tip of the free end of said pulling glass member to meet each axial center.

The process may include the steps of:

holding and fixing the fix end of the lower portion of said pulling glass member by said second holding member;

holding a tip of a free end of a upper portion of said pulling glass member by said pair of second axial center alignment mechanism having a self axial center alignment function to align the axial center of the tip of said free ends;

holding and fixing the fix end of the lower portion of said pulling glass member by said second holding member;

releasing said pair of axial center holding members of said second axial center alignment mechanism and positioning the tip of the free end of said pulling glass member, provisionally fixing a fix end of a upper portion of said extension optical fiber glass body to said first holding member;

holding a tip of a free end of a lower portion of said extension optical fiber glass body by said first axial center alignment mechanism and aligning an axial center of said tip of said free end;

holding and fixing said fix end of the lower portion of said pulling glass member body by said first holding member;

releasing said pair of axial center holding members of said first axial center alignment mechanism and positioning the tip of the free end of said extension optical fiber glass body at a predetermined position in said electric furnace; to thereby coincide the tip of the free end of said extension optical fiber glass body and the tip of the free end of said pulling glass member to meet each axial center.

The process may also include the steps of:

provisionally fixing a fix end of a upper portion of said extension optical fiber glass body to said first holding member, and holding and fixing the fix end of the lower portion of said pulling glass member by said first holding member;

holding a tip of a free end of a lower portion of said extension optical fiber glass body by said first axial center alignment mechanism and aligning an axial center of said tip of said free end; and holding a tip of a free end of a upper portion of said pulling glass member by said pair of second axial center alignment mechanism having a self axial center alignment function to align the axial center of the tip of said free ends;

holding and fixing said fix end of the lower portion of said extension optical fiber glass body by said first holding member; and holding and fixing the fix end of the lower portion of said pulling glass member by said second holding member; and releasing said pair of axial center holding members of said first axial center alignment mechanism and positioning the tip of the free end of said extension optical fiber glass body at a predetermined position in said electric furnace; and releasing said pair of axial center holding members of said second axial center alignment mechanism and positioning the tip of the free end of said pulling glass member, to thereby coincide the tip of the free end of said extension optical fiber glass body and the tip of the free end of said pulling glass member to meet each axial center.

According to the present invention, there is also provided an apparatus for extending an optical fiber body, comprising: a upper holder for holding a upper end of an extension optical fiber glass body to be extended; a lower holder, provided at a position coinciding an axial center with that of said upper holder and facing to said upper holder, holding a lower end of a pull glass member connected to a lower end of the extension optical fiber glass body, an axial center of said pull glass member being coincided an axial center of said extension optical fiber glass body, and said lower holder being pulled toward a lower portion, in response to an extension of said extension optical fiber glass preform; an electric furnace, provided between said upper holder and said lower holder, heating said extension optical glass preform; a moving means moving at least said lower holder toward a low position to pull said extending optical fiber glass preform; and a control means. The control means controls the following, when extending said optical fiber glass preform in said electric furnace, and after junction of the lower end of said optical fiber glass body and the upper end of said pull glass member by heat-melting manner, moving the maximum temperature portion of said electric furnace to the junction portion to heat and connect the junction portion, and controlling said movement means to lower said lower holder, to thereby move the maximum temperature portion of said electric furnace from said junction portion to the extending portion of said optical fiber glass preform.

Preferably, a dummy member is connected to the lower end of said extension optical fiber glass body, a diameter of a lower tip of said dummy member being smaller than a diameter of the upper tip of said pulling glass member, a diameter of a upper tip of said dummy member being substantially equal to or close to a diameter of said extension optical fiber glass body, said dummy member has a semi-conical shape in the upper tip and said dummy member being formed by a material equal to that of said extension optical fiber glass body, and said control means controls the movement of said moving means to move said lower holder downward to thereby extend said extension optical fiber glass body connected said dummy member at the lower tip thereof.

Preferably, the diameter of said lower tip of said dummy member is approximately ½ to ⅓ of the diameter of said upper end of said pulling glass member.

According to the present invention, there is further provided an apparatus for extending an extension optical fiber glass body, comprising: a upper holder for holding a upper end of an extension optical fiber glass body to be extended; a lower holder, provided at a position where an axial center thereof coincides with and an axial center of said upper holder, holding a lower end of a pulling glass member a upper end of which is connected to a lower end of said extension optical fiber glass body to coincide both axial centers, and movable downward in response to the extension of said extension optical fiber glass body; an electric furnace provided between said upper holder and said lower holder and heating said extension optical fiber glass body; a temperature measurement unit for measuring the temperature of an extending portion of said extension optical fiber glass body; a speed meter for measuring an extension speed of said extension optical fiber glass body after extension; a moving means for moving at least said lower holder downward to pull said extension optical fiber glass body after extension; and a control means; the control means reads the temperature from the temperature measurement unit and the extension speed from said speed meter, and controls said moving means to continuously raise set extension speed to a predetermined steady extension speed from the beginning of the extension to the steady extension state.

Preferably, said control means controls the heat power of said electric furnace to raise the temperature of said electric furnace in response to the increase of said extension speed.

Preferably, the apparatus for extending an extension optical fiber glass body further comprises an extension shape measurement means for measuring a shape of said extending portion of said extension optical fiber glass body, and said control means reads the shape information from said extension shape measurement means and controls the movement speed of said moving means to control said extension speed and the heat power of said electric furnace to control said heat temperature, to thereby maintain a meniscus angle of said extending portion, said meniscus angle being determined by said read shape information.

Preferably, said control means controls said moving means and said electric furnace so that said extending meniscus angle is kept 2 to 4 degree.

According to the present invention, there is provided a method of extending an optical an fiber glass body in an electric furnace, the method including the step of raising an extension speed of an extended optical fiber glass body to a predetermined extension speed, from the beginning of the extension to the steady extension state.

The method may include a step of controlling said extension speed so that a meniscus angle at an extending portion of said optical fiber glass body is kept 2 to 4 degree.

The method may further include a step of raising a heating temperature of the electric furnace in response to the raise of said extension speed.

BRIEF DESCRIPTION OF THE DRAWINGS

These and other objects and features of the present invention will be more apparent from the following description of the preferred embodiments given with reference to the accompanying drawings, wherein:

FIG. 9A and FIG. 9B are explanatory views of a state where a dummy member of the end portion of the glass body is connected to the end portion of the pulling use glass member, in which FIG. 9A shows a good connection state and FIG. 9B shows a poor connection state;

FIG. 10 is a graph illustrating the temperature, extension rate, and extension speed of a glass body from an initial state to a steady state;

DESCRIPTION OF THE PREFERRED EMBODIMENTS

Below, an explanation will be given of preferred embodiments of an electric furnace extending method and extension apparatus for an optical fiber glass body of the present invention by referring to the attached drawings.

First Embodiment

An extension apparatus for an optical fiber glass body according to a first embodiment of the present invention and a method of affixing the optical fiber glass body in the extension apparatus will be explained first by referring to FIG. 2 to FIG. 4.

Figure 1:
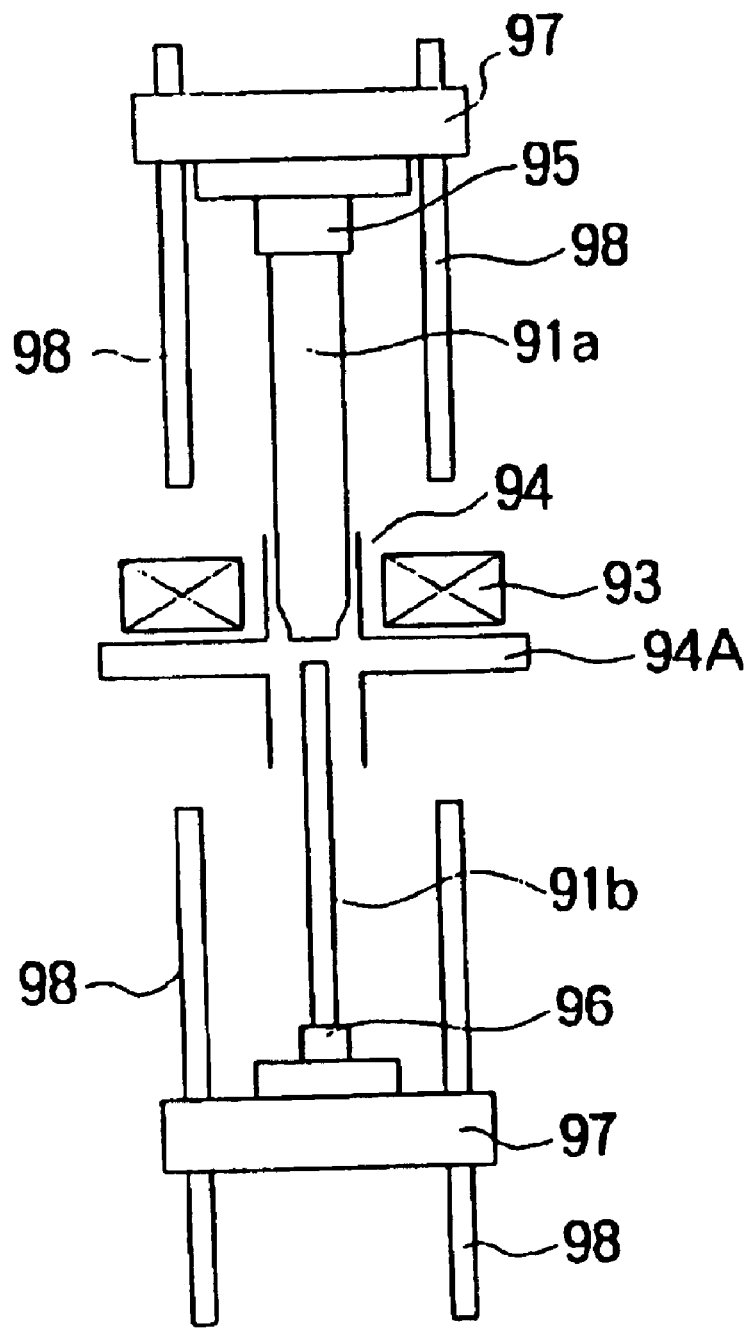
FIG. 1 is a view of the configuration of an extension apparatus for a optical fiber glass body of the related art.
Figure 2:
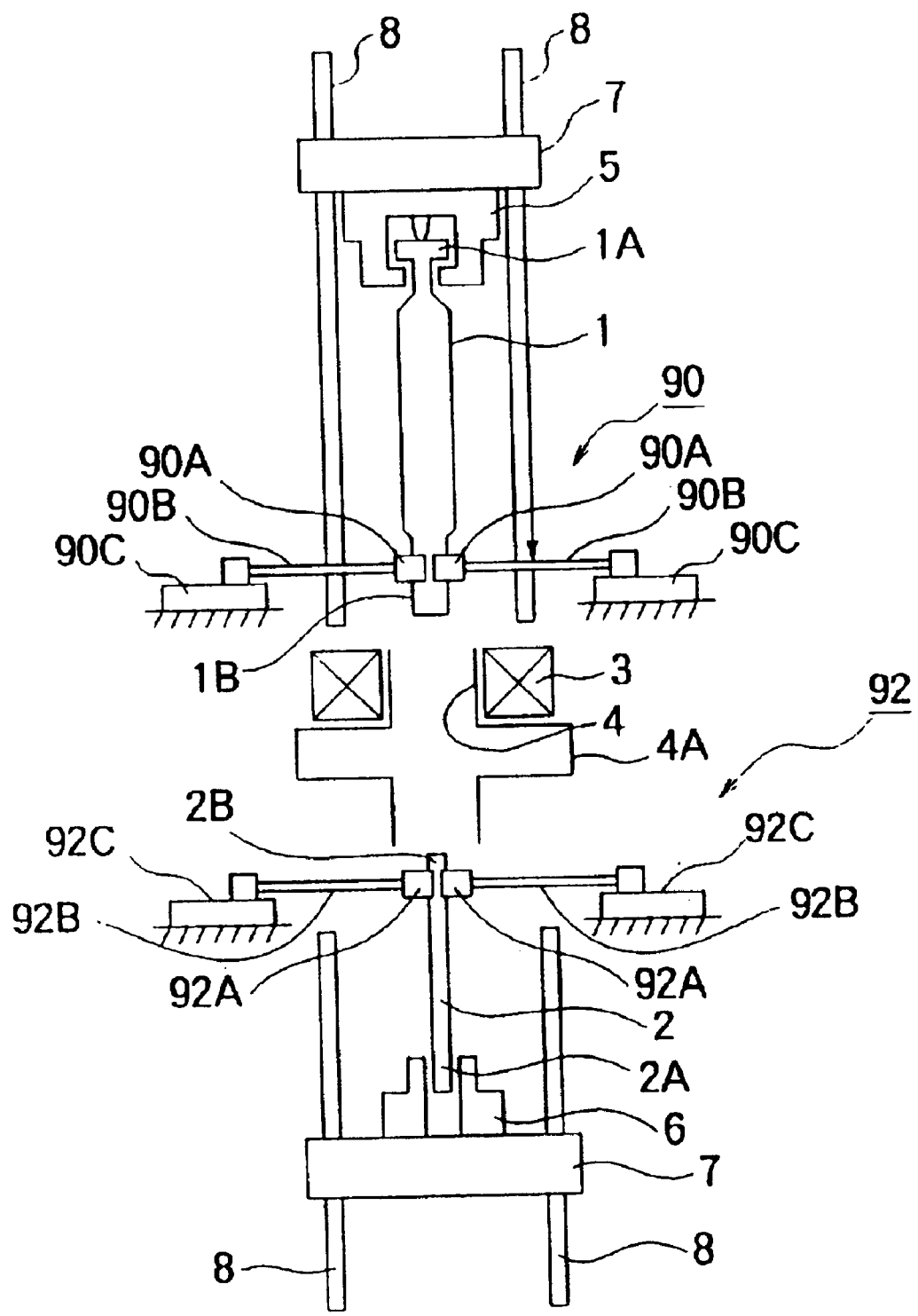
FIG. 2 is a view of an example of the configuration of an extension apparatus of an optical fiber glass body of the present invention.

In FIG. 2, 1 denotes an extension (stretch) optical fiber glass body (optical fiber glass body or preform) to be extended (stretched), and 2 denotes a dummy pulling use glass member (extension (stretch)-out use glass member). Reference numeral 3 denotes an electric furnace body. A furnace pipe 4 containing an electric heater is disposed in the electric furnace body 3. Reference numeral 4A denotes an observation window for observing the interior of the furnace pipe 4.

A gripping member 5 for gripping and affixing the fixed end portion 1A of the upper portion of the extension use glass body 1 is provided in the upper portion of the furnace pipe 4. A gripping member 6 for gripping and affixing the fixed end portion 2A of the lower portion of the pulling use glass member 2 is provided in the lower portion of the furnace pipe 4.

The gripping (holding) members 5 and 6 can move in the vertical direction by the moving stand 7 to which the gripping members 5 and 6 are affixed. Reference numeral 8 denotes a guide rail for guiding the moving stand 7.

Figure 3:
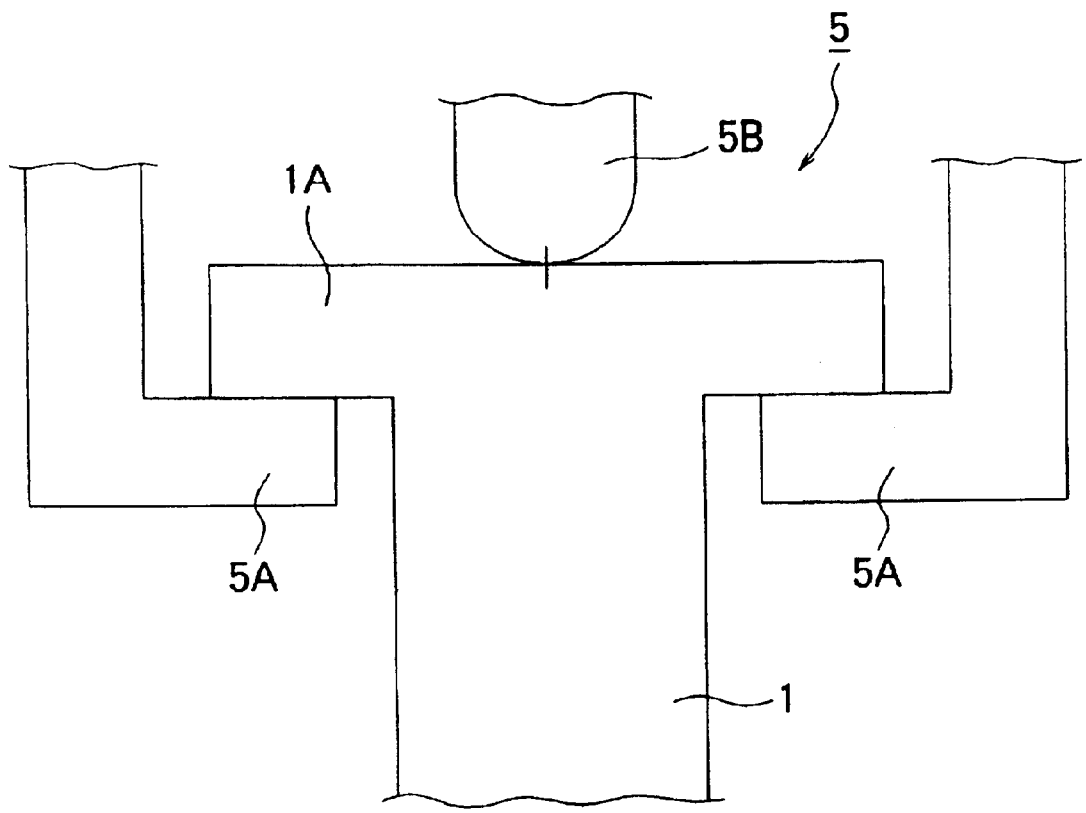
FIG. 3 is a view of an example of a gripping member provided in the extension apparatus of the optical fiber glass body illustrated in FIG. 2 for gripping and affixing the glass member.

The gripping member 5 for gripping and affixing the extension use glass body 1 has for example two key-like glass member support claws 5A and 5A arranged in parallel as shown in FIG. 3. A glass member fixing member 5B having a spherical front end for affixing the upper portion of the fixed end portion 1A of the extension use glass body 1 gripped in the space between these support claws 5A and 5A is provided above the space between the two glass member support claws 5A and 5A. The glass member fixing member 5B can be moved in the vertical direction by for example a hydraulic drive. Note that the glass member fixing member 5B is not limited to a hydraulic drive. Another appropriate drive source, for example, an electric motor, hand screw, and air pressure drive may also be used.

Note that, the shape of the gripping member 5 comprising the two glass member support claws 5A and 5A and glass member fixing member 5B is not limited to that of FIG. 3 and may be another shape.

The gripping member 6 for gripping and affixing the fixed end portion 2A of the pulling use glass member 2 is for example a well known three-claw chuck.

The extension (stretching) apparatus for an optical fiber glass body of the present invention is further provided with a first (upper portion) centering mechanism 90 for the axial alignment and centering of the front end of the free end portion 1B of the lower portion of the extension use glass member 1 between the furnace pipe 4 and the gripping member 5.

Figure 4:
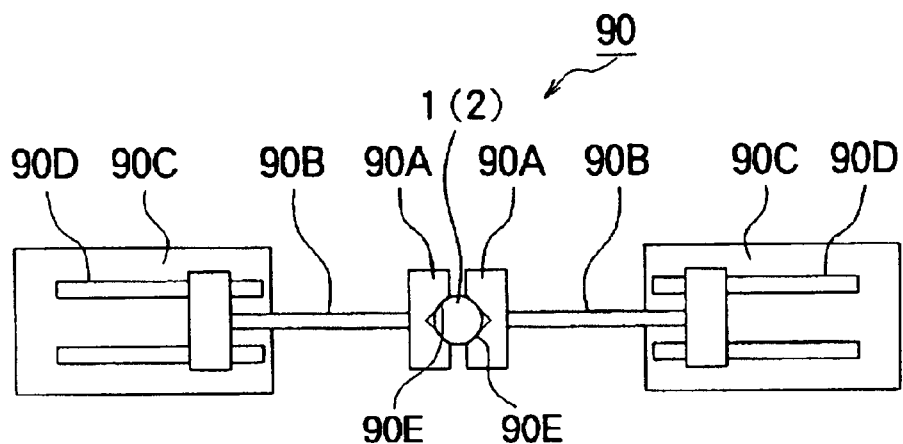
FIG. 4 is an explanatory view of an example of a centering mechanism provided in the extension apparatus of the optical fiber glass body illustrated in FIG. 2 for centering a front end of a free end portion of the glass member.

The centering mechanism 90 is provided with for example, as shown in FIG. 4, a pair of centering grips 90A and 90A having a self-centering action (a self alignment function), a pair of support rods 90B and 90B provided at opposing positions for supporting the centering grips 90A and 90A, and a pair of bases (or pedestals) 90C and 90C having movement mechanisms using a hydraulic drive for integrally moving the centering grips 90A and 90A and the support rods 90B and 90B in the horizontal direction. Note that the movement mechanisms provided in the pedestals 90C and 90C are not limited to hydraulic drives. Other appropriate drive sources, for example, electric motors, hand screws, and air pressure drives may also be used. In the figure, 90D and 90D on the two sides denote guide rails.

The pair of centering grips 90A and 90A are provided with a pair of opposing V-grooves 90E and 90E in the axial direction of the extension use optical fiber glass body 1 at the center of the opposing surfaces thereof.

The extension apparatus for an optical fiber glass body of the first embodiment of the present invention is further provided with a second (lower portion) centering mechanism 92 for performing the axial alignment for the front end of the free end portion 2B of the lower portion of the pulling use glass member 2 between the furnace body 3 and the gripping member 6 for gripping and affixing the pulling use glass member 2.

The structure of the lower portion centering mechanism 92 for performing the axial alignment and centering for the front end of the free end portion 2B of the pulling use glass member 2 is similar to the structure of the upper portion centering mechanism 90 illustrated in FIG. 4 for performing the axial alignment and centering for the front end of the free end portion 1B of the drawing use glass body 1, therefore a detailed explanation will be omitted.

Note that the shape of the upper portion centering mechanism 90 and the lower portion centering mechanism 92 is not limited to the shape shown in FIG. 4. Other shapes can be adopted too.

The method of fixing the glass body to the extension apparatus for an optical fiber glass body constituted as described above is as follows.

1. Temporary Fixing of Extension Use Glass Body 1

First, the disk-shaped fixed end portion 1A of the upper portion of the extension use optical fiber glass body 1 is attached between the two key-shaped glass member support claws 5A and 5A arranged in the gripping member 5 and temporarily affixed.

2. Gripping of Lower Portion of Drawing Use Glass Body 1 by Upper Portion Centering Mechanism 90

Next, the front end of the free end portion 1B of the lower portion of the extension use optical fiber glass body 1 is gripped by the pair of centering grips 90A and 90A having a self-centering action of the upper portion centering mechanism 90 and the axial center of the front end of the free end portion 1B is centered. Namely, since the front end of the free end portion 1B is in a free state, when it is pressed by the pair of centering grips 90A and 90A having the V-grooves 90E and 90E in the axial direction of the extension use optical fiber glass body 1, the axial center of the free end portion 1B will be set at the center of the circle inscribed by the two V-grooves 90E and 90E. At this time, by aligning the center of the circle inscribed by the two V-grooves 90E and 90E with the axial center of for example the furnace pipe 4 in advance, the axial center of the free end portion 1B can be aligned with the axial center of the furnace pipe 4.

3. Gripping and Affixing of Fixed End Portion 1a of Upper Portion of Extension Use Glass Body 1 by Gripping Member 5

After the front end of the free end portion 1B of the lower portion of the extension use optical fiber glass body 1 is gripped by the upper portion centering mechanism 90 and the axial center of the front end of the free end portion 1B is centered as explained above, the disk-shaped fixed end portion 1A of the upper portion of the extension use optical fiber glass body 1 is gripped and affixed again by the gripping member 5. The gripping and affixing of the fixed end portion 1A are carried out by pressing the upper portion of the fixed end portion 1A of the extension use optical fiber glass body 1 gripped in the space between the two support claws 5A and 5A by the glass member fixing member 5B having spherical front end. Namely, the extension use optical fiber glass body 1 is gripped and affixed in a state where the axial center of the front end of the free end portion 1B is centered by the upper portion centering mechanism 90 by two support claws 5A and 5A and one glass member fixing member 5B as illustrated in FIG. 3.

4. Retraction of Centering Grips 90a and 90a of the Upper Portion Centering Mechanism 90 from Axial Center Next, the pair of centering grips 90A and 90A of the upper portion centering mechanism 90 are retracted from the axial center to thereby set the front end of the free end portion 1B at a predetermined position in the furnace pipe 4.

5. Gripping and Affixing of Pulling Use Glass Member 2 by Gripping Member 6

Next, the pulling use glass member 2 is gripped and affixed by the gripping member 6. The fixed end portion 2A of the lower portion of the pulling use glass member 2 is temporarily affixed to the gripping member 5 in a state with a predetermined amount of free play.

6. Centering of Axial Center of Front End of Free End Portion 2b by Lower Portion Centering Mechanism 92

The front end of the free end portion 2B of the upper portion of the pulling use glass member 2 is gripped by the pair of centering grips 92A and 92A having a self-centering action of the lower portion centering mechanism 92 in this state to center the axial center of the front end of the free end portion 2B.

The method of centering the axial center of the front end of the free end portion 2B by the lower portion centering mechanism 92 is similar to the centering of the axial center of the front end of the free end portion 1B of the extension use optical fiber glass body 1 using the upper portion centering mechanism 90, therefore a detailed explanation will be omitted.

7. Main Gripping and Affixing of Pulling Use Glass Member 2

After the axial center of the front end of the free end portion 2B of the upper portion of the pulling use glass member 2 is centered, the fixed end portion 2A of the lower portion of the pulling use glass member 2 is gripped and affixed again by the gripping member 6. At this time, the pulling use glass member 2 is gripped and affixed in a state where the axial center of the front end of the free end portion 2B is centered by the lower portion centering mechanism 92.

8. Retraction of Centering Grips 92a and 92a of Lower Portion Centering Mechanism 92 from Axial Center and Alignment of Axial Centers of Two Free End Portions 1b and 2b Next, the pair of centering grips 92A and 92A of the lower portion centering mechanism 92 are retracted from the axial center to thereby set the front end of the free end portion 2B at the predetermined position in the furnace pipe 4, then the front end of the free end portion 1B of the extension use optical fiber glass body 1 and the front end of the free end portion 2B of the pulling use glass member 2 are abutted. The two free end portions 1B and 2B are centered in the axial center of the furnace pipe 4, therefore they will be abutted in a state where the two axial centers align.

9. Extending (Stretching) Work

Next, in the same way as in the related art, the furnace pipe 4 is heated to the predetermined temperature to heat and fuse the two abutted end surfaces to join the members, then the gripping member 6 gripping the pulling use glass member 2 is moved downward at a predetermined speed while moving the gripping member gripping the extension use optical fiber glass body 1 downward at a constant speed so as to stretch the extension use optical fiber glass body 1 and extend it to a predetermined outer diameter.

10. Drawing Extended Optical Fiber Glass Body to Final Optical Fiber cable.

The above extended optical fiber glass body (preform) 1 is drew as a final optical fiber, such as a single optical fiber including a core having a diameter of 10 mm, a cladding formed an outer circumference of the core and having a diameter of 125 μm, and a resin coating provided an outer circumference of the cladding.

Note, the above steps 1 to 8 can be changed in its sequence.

Experiment of First Embodiment

The following experiment was carried out by the extension apparatus for an optical fiber glass body shown in FIG. 2 to FIG. 4.

The used glass body 1 had an outer diameter of 70 mm and a length of 1000 mm. The outer diameter of the dummy material of the end portion of the body on the pulling use glass member side was 15 mm. Also, the outer diameter of the end portion of the pulling use glass member was 20 mm.

As a result of the experiment, the deviation of the axial centers of the two free end portions 1B and 2B in the furnace pipe 4 was within the range of ±0.1 to 0.2 mm (0.5 to 1% of the diameter of the glass member) in the horizontal plane, so the precision of the centering of the axial centers was improved to about 10 times that of the related art.

As a result of extending the glass body 1 as described above, no bending occurred in the drawn glass body for the optical fiber. Further, the vicinity of the connection portion did not break at the time of drawing.

Effect of First Embodiment

According to the extension apparatus for an optical fiber glass body of the first embodiment, since a centering mechanism provided with a pair of centering grips is provided between each end portion of the furnace pipe and the two glass member grips, the axial alignment of the free ends of the two glass members can be easily and simply carried out.

Further, according to the method of fixing the optical fiber body to the extension apparatus explained above, since the axial centers of the front ends of the free end portions of the two glass members temporarily fixed by the glass member grips are adjusted by the centering mechanisms provided with the pairs of centering grips, the axial alignment thereof can be easily and simply carried out in a short time.

Further, since the fixed end portions of the two glass members are affixed after the axial centers of the front ends of the free end portions of two glass members are aligned as described above, they can be abutted and connected in a state where the axial centers of the front ends of the free end portions of two glass members moved into the furnace pipe are aligned. As a result, the distribution of stress at the cross-section of the connection portion of the two becomes uniform, the vicinity of the connection portion of the two no longer becomes slanted, and breakage can be avoided.

Second Embodiment

As a second embodiment of the present invention, an explanation will be given of an electric furnace extending (stretching) method comprising the steps of: abutting the end portion of the optical fiber glass body and the end portion of the pulling use glass member, heating and fusing them in the electric furnace extending process by the first embodiment for connection, moving the highest temperature portion of the electric furnace to this connection portion for heating and fusing, moving this highest temperature portion from the heat fused portion to the extending portion of the extension optical fiber glass body side, then drawing of the glass body.

Figure 5:
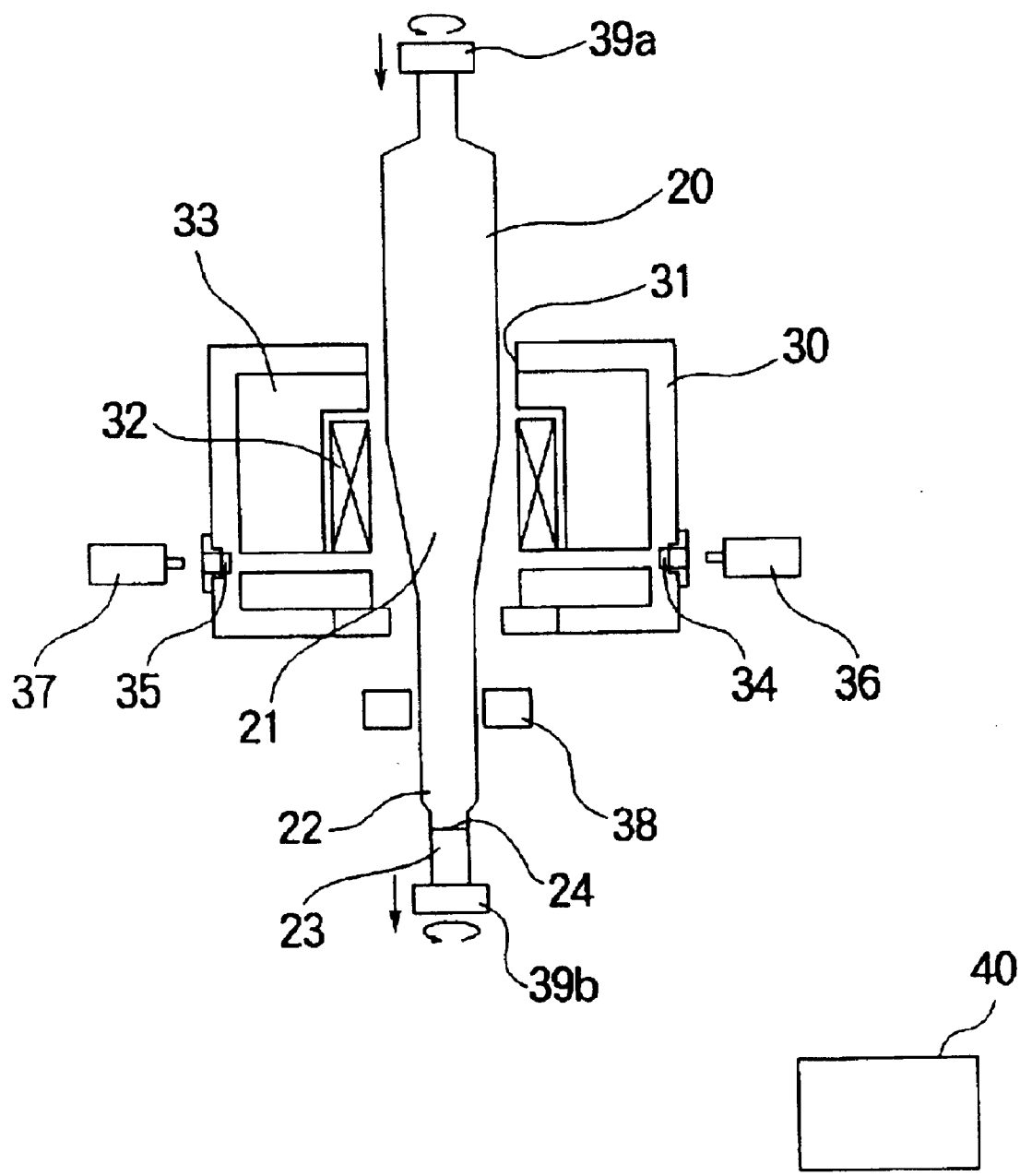
FIG. 5 is an explanatory view of an electric furnace extension apparatus and a state of a glass body being extended by the apparatus.

FIG. 5 is a view of the configuration of the electric furnace drawing apparatus according to the second embodiment and the state of extending the glass body by this apparatus.

In FIG. 5, 30 denotes the furnace body, 31 a furnace pipe, 32 a heater, 33 a heat insulation material, 34 and 35 denote windows, 36 an outer diameter measurement unit, 37 a temperature meter, 38 an outer diameter measurement unit of the extending rod, and 39a and 39b denote gripping portions.

Reference numeral 20 denotes the optical fiber glass body for extending, 21 a drawn portion (portion of changed outer diameter), 22 an extension rod, 23 a pulling use (extend-out use) glass member, and 24 a connection portion. In the second embodiment of the present invention, the extending is carried out by using the apparatus illustrated in FIG. 5.

Figure 6:
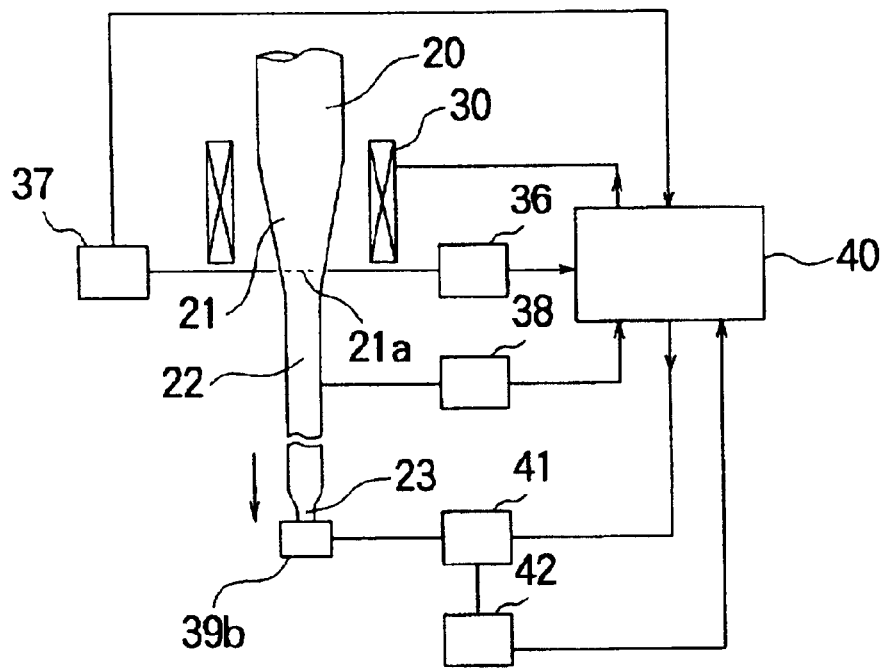
FIG. 6 is an explanatory view of the main control system relating to the present invention.

The second embodiment of the present invention can be carried out by a control apparatus shown in FIG. 6.

FIG. 6 is a view of the configuration of the control system in the electric furnace extension apparatus for an optical fiber glass body according to a fourth embodiment of the present invention.

The control system includes a control means 40 such as computer, the first outer diameter measurement unit 36 for measuring an outer diameter of the extension start position (meniscus portion) 21a of the extension optical fiber glass body to measure a meniscus shape of the extension start position, i.e., an angle of the meniscus shape of the meniscus portion 21a, the temperature measurement unit 37 for measuring the temperature of the meniscus portion 21a, the second outer diameter measurement unit 38 for measuring an outer diameter of the extended (stretched) optical fiber glass body (preform) 22 at the out side of the electric furnace 30, the moter 41 for moving downward the gripping member 39b to extend (stretch) the extended optical fiber glass preform 22 downward, and the speed meter 42 such as a taco-meter for measuring the rotation speed of the motor 41 to measure the extension speed of the extended optical fiber glass body 22.

Basically, the control means 40 reads the second diameter of the extended optical fiber glass body 22 from the second outer diameter measurement unit 38, the extension speed from the speed meter 42 and the temperature from the temperature measurement unit 37, and controls the heater power of the electric furnace 30 and the rotation speed of the moter 41 to maintain the second outer diameter of the extend optical fiber glass body 22 at a predetermined value.

In this embodiment, the control means 40 controls the heating and fusing the junction (abutting) portion of the extension optical fiber glass body 20 and the pulling glass member 23 by controlling the heater power of the electric furnace 30, after abutting the end portion of the extension optical fiber glass body 20 and the end portion of the pulling glass member.

Next, the control unit 40 controls the movement of the highest temperature portion of the electric furnace 30 to the junction (abutting) portion. Further, the control unit 40 controls the movement of the highest temperature portion from the heat fused portion to the extension portion 22B of the extension optical fiber glass body 20. Therefore, the control unit 40 controls the normal extension of the extension optical fiber glass body 20 to produce the extended optical fiber glass body having the predetermined diameter (second outer diameter).

At the initial state of the extension of the optical fiber glass body 20, the control means 40 changes the heating temperature in the electric furnace 30 and the extension speed, as shown in FIG. 10. This will be discussed later.

In the normal extension process, the control unit 40 controls the shape, especially, the angle of the meniscus portion 22a in a predetermined value, for example 4 degree, or in a predetermined range, preferably, 2 to 4 degree. This will be discussed later.

Figure 7:
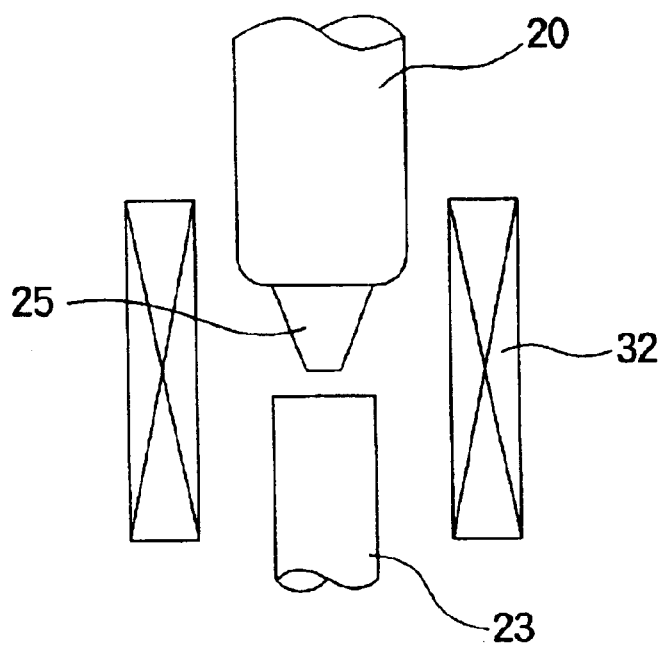
FIG. 7 is an explanatory view of an internal portion of the electric furnace extension apparatus illustrated in FIG. 2 and shows the state in which a dummy member is attached to the end portion of the glass body and before connection of the end portion of the glass body and the end portion of a pulling use glass member.

FIG. 7 is a view of an internal portion of the electric furnace drawing apparatus. FIG. 7 shows the state before connection of the end portion of the optical fiber glass body 20 and the end portion of the pulling use glass member 23. A dummy material 25 is attached to the end portion of the glass body in advance.

Figure 8:
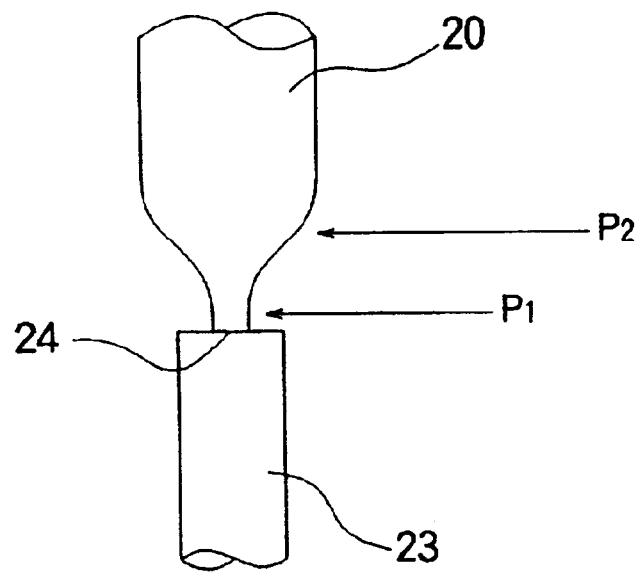
FIG. 8 is an explanatory view in which a first maximum heating portion is defined as a connection portion $P_1$ and the maximum heating portion is shifted to an extension portion $P_2$ of the body.

FIG. 8 is an explanatory view of the movement of the highest temperature portion in the electric furnace in FIG. 6 from the connection portion $P_1$ of the two members to the extending portion $P_2$ of the glass body side and the extending of the same. A distance L between the connection portion $P_1$ and the extending portion $P_2$ is for example about 10 to 40 mm.

According to the second embodiment, after the connection of the glass body 20 and the pulling use glass member (dummy extend-out use glass member) 23, the extension work immediately becomes possible in the same step, therefore the efficiency of the extension work is improved.

Figure 9A:
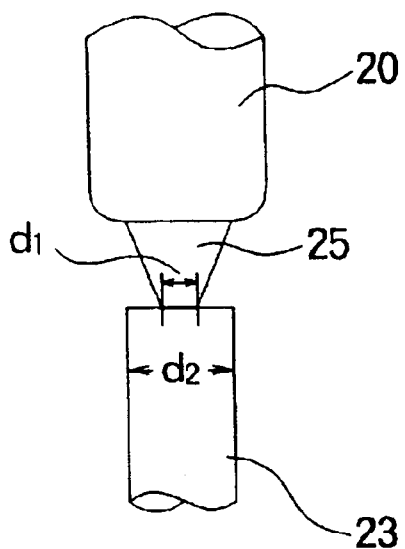
Figure 9B:
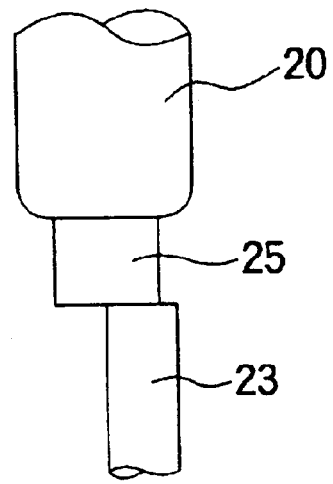

FIGS. 9A and 9B show the shape of the two end portions when the end portion 24 of the glass body 20 and the end portion of the pulling use glass member 23 are connected.

As shown in FIG. 9A, the outer diameter $d_1$ of the dummy material 25 of the end portion of the optical fiber glass body 20 is made smaller than the outer diameter $d_2$ of the end portion of the pulling use glass member 23. By doing this, a preferable reliable connection is obtained. The outer diameter of the end portion of the pulling use glass member 23 is preferably made two to three times the outer diameter of the dummy material of the end portion of the optical fiber glass body.

FIG. 9B illustrates an example of a poor connection in which the outer diameter of the end portion of the glass body 20 is larger than the outer diameter of the end portion of the pulling use glass member 23.

Experiment of Second Embodiment

A drawing use glass body having an outer diameter of 65 mm was used. A dummy material 25 (upper portion outer diameter: 35 mm, lower portion outer diameter: 10 mm, and height: 30 mm) shown in FIG. 9A was connected to the front end of this. Further, use was made of a pulling use (draw-out use) glass member having an outer diameter of 38 mm. After fusing and connecting the end portions of the two, the highest temperature portion in the electric furnace was moved from the connection portion to the drawing portion of the glass body which was then drawn at a drawing rate of 38 mm/min. As a result, there was no bending in the drawn body, and the precision of the outer diameter could be controlled to 34 mm±0.5 mm in the overall length of 1300 mm.

Third Embodiment

The third embodiment of the present invention is a method and apparatus of electric furnace extension of an optical fiber glass body comprising, when extending the optical fiber glass body at the highest temperature portion inside the electric furnace, measuring the temperature of the glass body extension portion, the outer diameter, and the extension rate and, while controlling them, gradually raising the extension rate, extension speed and heating temperature from the start of extension to be steady state, as shown in FIG. 10.

In this case, preferably the extension operation is controlled by feeding back to the extension rate extension speed the value of the first outer diameter measured when the angle of the extended meniscus of the extension portion 22a of the glass body 20 is 4° or less.

By controlling the extension operation of the control means 40 in this way, the bending of the extended body is prevented, fluctuation of the second outer diameter is eliminated, and the precision is improved.

Further, the extension rate (extension speed) is increased and the productivity is improved. The extension rate referred to in the present invention means the rate at which the drawn rod is formed. The extension rate is set at the start of extension for example 20 to 40 mm/min and gradually made higher to 40 to 70 mm/min at the steady state, as shown in FIG. 10. This is for improvement of the productivity.

In the present invention, since the extension rate is gradually made faster, preferably, it is necessary to also control the temperature of the furnace. The reason for the slow extension rate at the start of the extension operation is that there is no data on the outer diameter measured since the meniscus is not formed at the start of the extending and also that a fast extension rate is a cause of trouble, therefore it is necessary to keep the initial extension rate low.

On the other hand, in the present invention, when the meniscus is formed and it becomes possible to measure the outer diameter of this part, it becomes possible to control the extension operation by feeding back to the extension rate the measured value of the outer diameter of the extended meniscus, therefore the extension rate can be made faster.

The above control is performed by the control system shown in FIG. 6.

Figure 11:
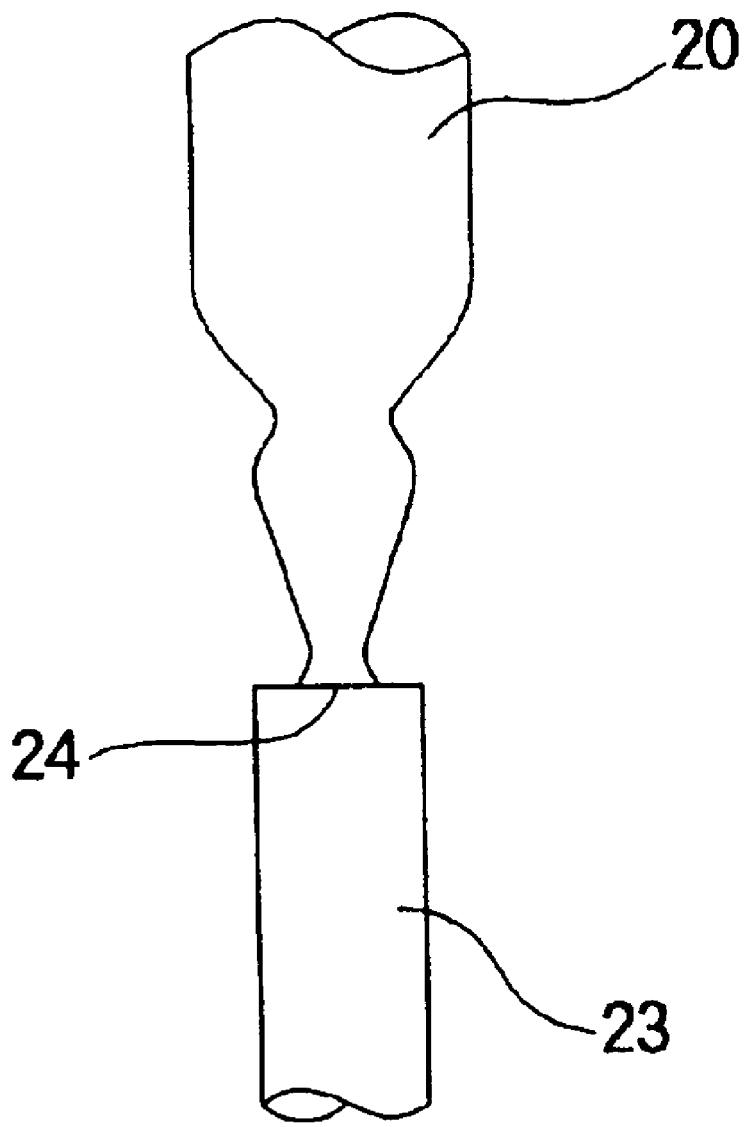
FIG. 11 is a view of a state of deformation of the glass body before the start of drawing.

FIG. 11 shows the shape of the glass body in the initial stage of drawing in which the meniscus has not yet been formed.

Figure 12:
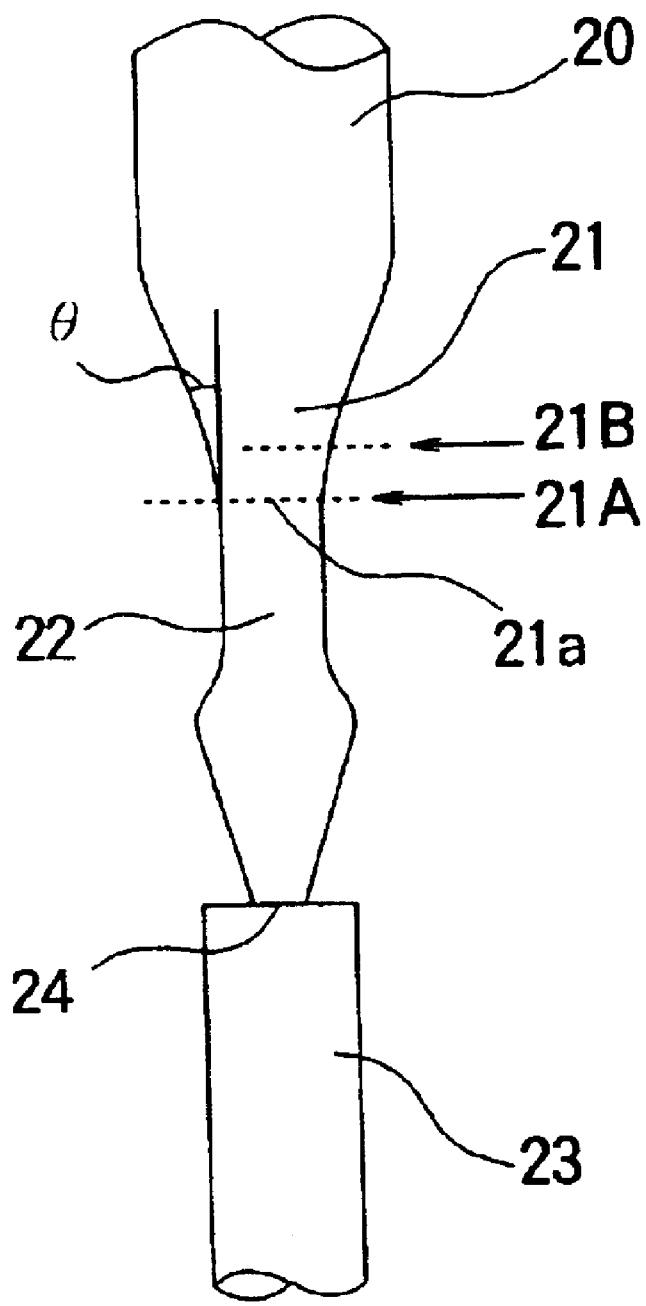
FIG. 12 is a view of the shape of the extended portion of the glass body when an extended meniscus shape is formed after the start of the extending.

FIG. 12 shows the state where the drawn meniscus is formed after an elapse of a predetermined time and the shape of the glass body changes.

In FIG. 12, the first portion 21A for measurement of the outer diameter of the extended portion 21 of the optical fiber glass body 20 is located at the position where the meniscus angle θ at the extended meniscus 21a is 4° or less.

The second portion 21B for measurement of the outer diameter is located at the position where the meniscus angle exceeds 4° (upper portion of 21A). In the control of the outer diameter, the measurement value of the outer diameter at the position where the meniscus angle of the first outer diameter measurement portion 21A is 2 to 4° is preferred.

Therefore, preferably the outer diameter value when the meniscus angle is 2 to 4° is used for control.

The second measurement portion 21B is too close to the optical fiber glass body 20, therefore the outer diameter has not yet become smaller, the meniscus angle is large, and the measurement position is located in the upper portion, so control is hard.

Experiment of Third Embodiment

An extension use glass body having an outer diameter of 70 mm was used. A dummy material 25 (upper portion outer diameter: 45 mm, lower portion outer diameter: 10 mm, and height: 30 mm) shown in FIG. 9A was connected to the front end of this extension use glass body. Further, use was made of a pulling use (draw-out use) glass member having an outer diameter of 38 mm. After fusing and connecting the end portions of the two, the highest temperature portion in the electric furnace was moved from the connection portion to the extending portion of the glass body. The initial extension rate was set to 30 mm/min, then was gradually raised to obtain a steady state extension rate of 50 mm/min. In this case, the temperature, outer diameter, and extension rate of the extending portion of the glass body were measured and controlled for the extension operation. Note that the control was carried out by using the measurement value of the outer diameter when the angle of the extending meniscus was 3°. As a result, there was no bending in the extended body, and the precision of the outer diameter could be controlled to 36±0.5 mm over the entire length.

The above embodiments explained above were only examples. The present invention includes various modifications.

For example, the first outer diameter measurement unit 36 can be replaced by an imaging apparatus such as a CCD camera for measuring the shape and angle of the meniscus portion 21a.

As mentioned above, in the present invention, when connecting the extension use glass body and the pulling use (draw-out use) glass member in the electric furnace extending process of the optical fiber glass body, the axial alignment of the two can be precisely, easily, and simply carried out. As a result, the distribution of stress at the cross-section of the connection portion of the two becomes uniform at the time of drawing, and the bending of the drawn body can be prevented. Further, the vicinity of the connection portion of the two no longer becomes slanted, and breakage is avoided.

Further, since the extending of the glass body can be immediately commenced after the fusing and bonding of the two members, the present invention is effective in the point of work efficiency.

Further, the present invention can gradually control and raise the extension rate, and preferably raise the heating temperature, from that at the start of extension and, uses the value of the first outer diameter of a predetermined position of the meniscus of the extended portion for this control, therefore can improve the precision of the outer diameter of the extended optical fiber glass body and the extension rate.

What is claimed is:

1. A process of connecting and fixing an extension optical fiber glass body to be extended and a pull glass member in an apparatus for extending the optical fiber glass body, comprising: an electric furnace for heating the optical fiber glass body; a first holding member positioned above said electric furnace, wherein the first holding member is arranged to move in a vertical direction relative to the apparatus and for holding and fixing a fixed end of an upper portion of said extension optical fiber glass body to be extended; a second holding member positioned below said electric furnace, wherein the second holding member is arranged to move in the vertical direction and for holding and fixing a fixed end of a lower portion of a pulling glass member; a first axial center alignment mechanism provided between said electric furnace and said first holding member and aligning an axial center of a tip of a free end of a lower portion of said extension optical fiber glass body; and a second axial center alignment mechanism provided between said electric furnace and said second holding member and aligning an axial center of a tip of a free end of the upper portion of said pulling glass member, an axial center of said first axial center alignment mechanism being met with an axial center of said second axial center alignment mechanism, said process including the steps of:

holding and fixing the fixed end of the lower portion of said pulling glass member using said second holding member;

holding the tip of the free end of the upper portion of said pulling glass member using a pair of axial centering grips of said second axial center alignment mechanism to provide a self axial center alignment function to align axial centers of the tips of said free ends;

releasing said pair of axial centering grips of said second axial center alignment mechanism and positioning the tip of the free end of said pulling glass member, provisionally fixing the fixed end of the upper portion of said extension optical fiber glass body to said first holding member;

holding the tip of the free end of the lower portion of said extension optical fiber glass body using a pair of axial center holding members of said first axial center alignment mechanism and aligning the axial center of said tip of said free end;

holding and fixing said fixed end of the lower portion of said pulling glass member body using said first holding member;

releasing said pair of axial center holding members of said first axial center alignment mechanism and positioning the tip of the free end of said extension optical fiber glass body at a predetermined position in said electric furnace;

to thereby coincide the tip of the free end of said extension optical fiber glass body and the tip of the free end of said pulling glass member to meet their respective axial centers.

* * * * *